United States Patent

[11] 3,604,865

[72] Inventor Carl E. Bricker
 Cuyahoga Falls, Ohio
[21] Appl. No. 36,903
[22] Filed May 13, 1970
[45] Patented Sept. 14, 1971
[73] Assignee The Goodyear Tire & Rubber Company
 Akron, Ohio

[54] BRAKE POSITION INDICATOR
 7 Claims, 4 Drawing Figs.
[52] U.S. Cl. .................................................... 200/61.4,
 188/1 A, 340/52 A
[51] Int. Cl. ..................................................... H01h 3/16
[50] Field of Search .......................................... 200/61.4,
 61.41, 61.42; 192/30 W; 188/1 A; 340/52 A

[56] References Cited
 UNITED STATES PATENTS
3,223,795 12/1965 Yerman ......................... 200/61.4
3,396,824 8/1968 Meier ............................ 188/1 A Primary Examiner—Robert K. Schaefer
Assistant Examiner—M. Ginsburg
Attorneys—F. W. Brunner, P. E. Milliken and Oldham & Oldham ABSTRACT: A device for indicating when the pads of a disc brake system are in contact with the brake disc. The device automatically compensates for the gradual reduction of thickness of the brake pads through wear. A pin extends rearwardly through the housing, is attached at one end to the piston and carries at its outer end a microswitch. A second pin also extends through the housing parallel to the first pin and contacts the operating lever of the switch as the piston moves toward the disc. The second pin is frictionally retained in the housing and is attached to the piston by a connection which causes movement of the second pin only when the piston moves beyond a predetermined amount.

INVENTOR
CARL E. BRICKER

INVENTOR
CARL E. BRICKER

BRAKE POSITION INDICATOR

Heretofore it has been impossible to provide an indicator on a disc brake which has an automatic adjustment-type spring return. With such brake systems, the relative position of the piston and lining compared to the housing is constantly changing due to the gradual wearing down of the lining. As a result there is no fixed reference point which may be used to determine when the brake is on or off.

It is the primary object of the present invention to provide an indicator which may be used in connection with disc brake systems of the automatic adjustment type for indicating when the brake pad is contacting or free from the disc. This is accomplished in accordance with the principles of the present invention by providing a first pin which moves axially with the piston and a second pin which provides a reference point by which to operate a switch mounted on the free end of the first pin. Adjustment of the position of the second pin is accomplished by stops on the piston so that the pin is moved inwardly in direct proportion to the amount of lining wear and thus provides a point relative to which the brake position may be determined.

It is also an object of the present invention to provide a brake position indicator which is of simple and reliable construction.

The above and other objects and advantages of the invention will become apparent upon consideration of the following specification and the accompanying drawings wherein there is shown a preferred embodiment of the present invention.

Figure 1:
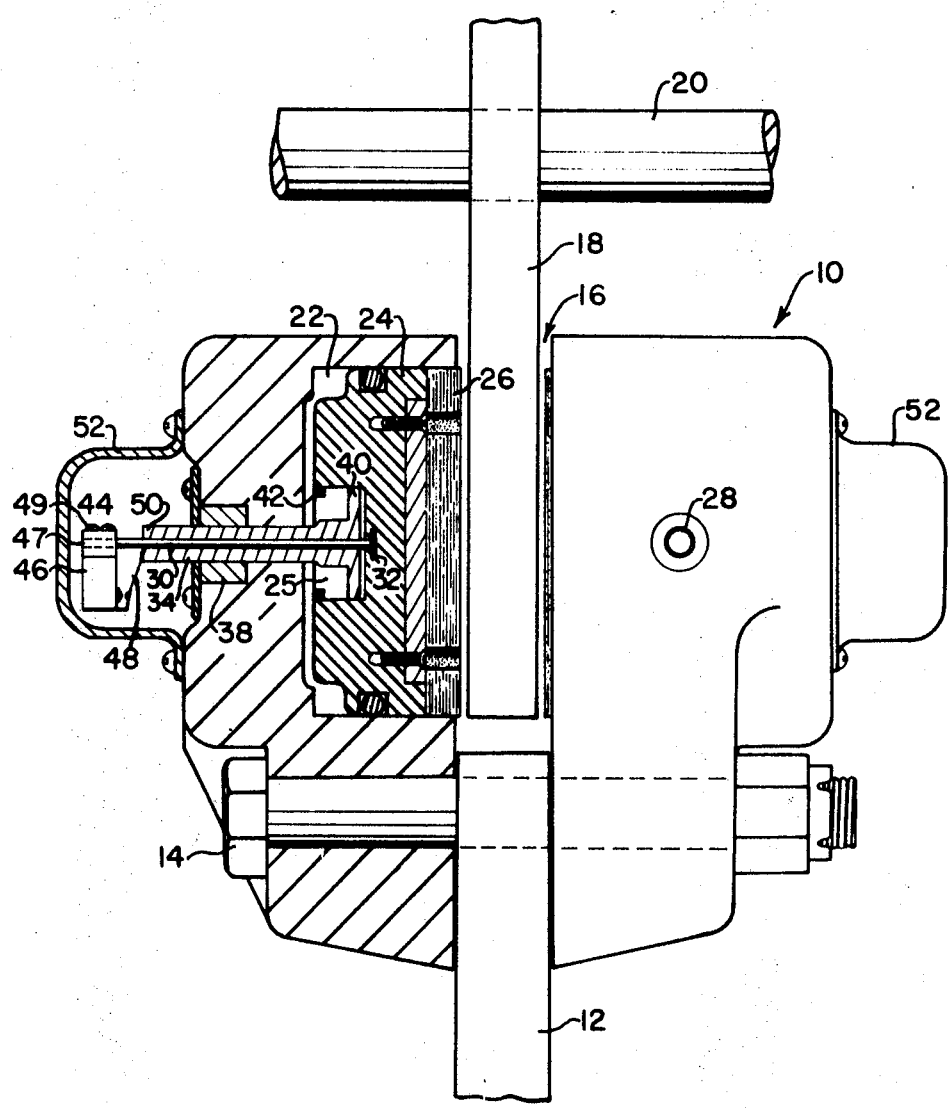
FIG. 1 is a side elevational view, partially in section, of a disc brake system employing the indicator device of the present invention.

The brake assembly consists of a pair of identical housings 10 which are mounted on opposite sides of a fixed support 12 by means of nuts and bolts 14. The adjacent faces of the assemblies 10 define a slot 16 through which passes a brake disc 18 which is mounted on a rotating shaft 20. Each of the assemblies 10 has a cylindrical bore 22 in which a piston 24 is carried for sliding movement toward and away from the disc 18. The outer face of the piston 24 carries a renewable brake pad 26. Fluid is applied to the rear portion of the chamber or bore 22 through ports 28 to force the piston 24 and brake pad 26 of each of the units 10 toward the disc 18 to clamp the opposite sides of the disc. It should be noted that the thickness of the pad 26 decreases as the face of the pad is worn away. As a result, the position of the piston 24 relative to the housing 10 when the pad 26 is in contact with the brake disc 18 varies and it is not possible to use the housing 10 as a reference point for determining the on or off positions of the brake.

Figure 2:
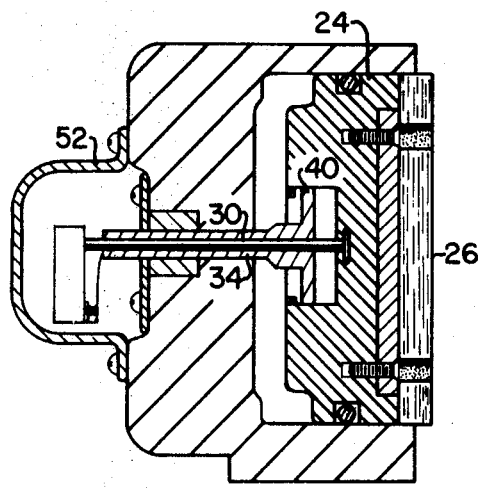
FIG. 2 is a fragmentary side elevational view, in section, showing the brake in applied position, with a new, unworn lining.
Figure 3:
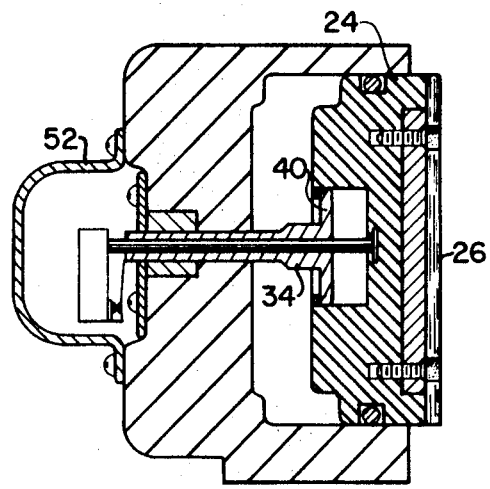
FIG. 3 is a view similar to that of FIG. 2 but showing the brake in an applied position after a portion of the lining has been worn away.

Extending rearwardly from the piston 24 is a pin 30 which has a head portion 32 retained in the piston 24 and which therefore moves axially with the piston 24. The pin 30 moves through a hollow pin 34 which also extends through the housing 10 and which is retained by a pin grip 38. The pin grip 38 serves to restrain the outer hollow pin 34 in a fixed position relative to the housing 10. The inner end of the hollow pin 34 has a flange or annular collar 40 which is slidably received within a cylindrical recess 25 on the rear of the piston 24 and which engages an annular stop 42 near the outer edge of the recess 25 as the piston moves toward the disc 18. As shown in FIGs. 2 and 3, the distance between the flange 40 of the hollow pin 34 and the stop 42 carried by the piston 24 is such that the pin 34 normally remains stationary as the piston moves toward or away from the brake disc 18, but is sufficiently short so that the stop 42 will contact the flange 40 and move the pin 34 inwardly as the movement of the piston 24 increases due to wear of the pad 26. This arrangement, by permitting the inner pin 30 to move axially relative to the outer pin 34 by a distance equal to that normally traveled by the piston 24 and brake pad 26 between the released and applied positions of the brake, provides relative points for determining the brake position. In order to utilize the relative positions of the pins 30 and 34, the outer end 33 of the pin 30 projects beyond the outer end 50 of the hollow pin 34 and a microswitch 46 is mounted on the outer end 44 of the inner pin 30. The switch 46 is adjustably mounted to pin 30 in any suitable manner, such as by a tightening band 47 and screws 49 associated therewith. The microswitch 46 has a leaflike actuating lever 48 which contacts the end 50 of the outer pin 34.

The indicating device described above operates in the following manner. When the brake is in its off or released state as shown in FIG. 1, the rear end 44 of the pin 30 projects a sufficient distance beyond the end 50 of the hollow pin 34 so that the switch 46 is in its normal or open state. When brake fluid under pressure is supplied to the port 28 and rear of the piston 24, assuming that the pad 26 has little or no wear, the piston 24 moves toward the disc 18 pulling with it the pin 30 and microswitch 46 mounted on the rear end of the pin 30. The operating lever 48 of the microswitch 40 contacts rear end 50 of the hollow outer pin 34 ad, as the pad 26 touches the side surface of the disc 18, the lever 48 is depressed sufficiently to close the switch 46 indicating a brake on state. The initial position of the switch 46 relative to the pin 30 is adjusted according to the thickness of the new pad 26 so that an accurate relative displacement between pins 30 and 34 is established. Once set, this distance remains constant during the life of the pad 26 and hence compensates for lining wear. Upon release of the brake, the piston 24 and pad 26 travel inwardly causing the pin 30 to move rearwardly relative to the end 50 of the hollow pin 34 and, as a result, the switch 48 returns to its open condition indicating a brake-released state.

As the surface of the pad 26 is worn away, the piston 24 travels a greater distance upon application of the brake. This additional travel of the piston is greater than the maximum distance between the annular collar 40 of the outer pin 34 and the annular stop 42 in the recess 25 of the piston 24. As a result, the additional movement of the piston 24 causes the pin 34 to be pulled inwardly and the relative spacing between the end 50 of the hollow pin 34 and the switch 46 mounted on the end of the inner pin 30 is maintained. When the brake pad 26 is sufficiently worn, it is replaced by a new, unworn pad, and the piston 24 returned to its innermost position. The relative spacing between the pins 34 and 30 is maintained as the annular collar 40 of the pin 34 contacts the annular stop 42 in the recess 25 and pin 34 is pushed with the piston 24 in the direction toward disc 18.

Figure 4:
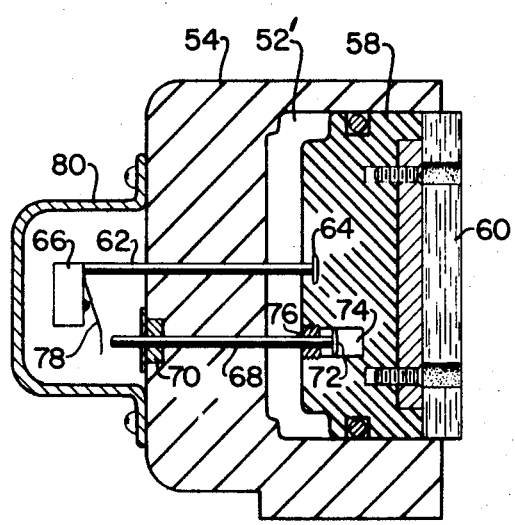
FIG. 4 is a fragmentary side elevational view of another embodiment of the indicator device of the present invention.

In the embodiment of my invention shown in FIG. 4, there is provided a housing 54 having a bore 52' brake piston 58, and a brake pad 60, all in accordance with conventional construction. A first pin 62 extends rearwardly through the housing and is connected at one end 64 to the piston 58 for axial movement therewith. A switch 66 is mounted on the outer end of the pin 62. A second pin 68 is also provided and this pin extends through the housing 54 parallel to the pin 62, but spaced therefrom. An adjustable pin grip 70 retains the pin 68 to prevent free movement thereof. The forward end of the pin 68 has an enlarged head 72 which is received with a recess 74 in the piston 58. A stop member 76 is carried by the piston 58 and surrounds the pin 68. The amount of free movement of the piston 58 relative to the end 72 of the pin is equal to the normal amount of travel of the piston 58 and brake pad 60. The other end of the second pin 68 contacts the operating arm 78 of the switch 66.

The operation of the second embodiment described above is identical to that of the previously described embodiment. Upon application of the brake when there is no wear on the face of the lining 60, the pin 68 remains stationary while the pin 62 and microswitch 66 move inwardly with the piston 58. The upper end of the pin 68 contacts the arm 78 and as the switch 66 moves inwardly causes the switch to close indicating a brake applied condition. Releasing of the brake causes the piston 58 to return into the bore 52' and the pin 62 and switch 66 again move rearwardly causing the switch 66 to return to its open state, indicating a brake-released condition. As movement of the piston 58 increases to compensate for wear of the brake pad 60, the head 72 of the second pin 68 abuts the annular stop 76 and the pin 68 is moved inwardly with the piston 58. This maintains the relative spacing between the outer end of the pin 68 and the switch 66.

It will be understood that other changes and modifications may be made to the described embodiments of the invention without departing from the spirit thereof. Reference should therefore be had to the appended claims in determining the true scope of the invention.

What is claimed is:

1. A brake position indicator for use on a hydraulic disc brake assembly having a housing and a piston slidably movable within said housing and mounting a brake pad on its outer face, comprising: a first pin connected to said piston for axial movement therewith and extending rearwardly through said housing; a second pin means connecting said second pin to said piston for limited axial movement of said piston relative to said second pin, said second pin extending rearwardly through said housing; and a switch mounted on the end of said first pin and responsive for actuation thereof to the relative position of said second pin.

2. The brake position indicator according to claim 1 wherein said first pin extends coaxially through said second pin.

3. The brake position indicator according to claim 2 wherein said second pin has an annular flange received within a cylindrical bore within said piston said bore having an annular stop member for engaging said flange of said pin upon movement of said piston beyond a predetermined amount.

4. A brake position indicator according to claim 3 wherein said predetermined amount of movement of said piston is substantially equal to the distance traveled by said piston from its normally released position to a position in which said brake pad is contacting the brake disc.

5. In a hydraulic disc brake assembly having a housing, a piston slidably received in a bore in said housing and mounting a brake pad on its outer face, the improvement comprising: a first pin connected to said piston for axial movement therewith, said first pin extending through said housing; a second pin frictionally retained in said bore in said housing; means for moving said second pin coaxially with said piston when said piston has traveled beyond a predetermined distance; and a switch mounted to one of said pins and responsive for actuation thereof to relative movement between said first and second pins.

6. The improvement according to claim 5 wherein said predetermined distance is equal to the minimum distance traveled by said piston from the brake-released to the brake-applied position thereof.

7. The improvement according to claim 6 wherein said switch is a normally open switch having an operating lever mounted on said first pin, movement of said first pin relative to said second pin by a distance equal to said minimum distance causing said second pin to contact the operating lever and close said switch.